April 19, 1955     C. P. SPAULDING     2,706,401
LOW FREQUENCY VIBROMETER

Filed Dec. 9, 1950     2 Sheets-Sheet 1

INVENTOR.
CARL P. SPAULDING
BY
ATTORNEY

April 19, 1955  C. P. SPAULDING  2,706,401
LOW FREQUENCY VIBROMETER

Filed Dec. 9, 1950  2 Sheets-Sheet 2

INVENTOR.
CARL P. SPAULDING
BY
*James B Christie*
ATTORNEY

United States Patent Office 2,706,401
Patented Apr. 19, 1955

2,706,401

LOW FREQUENCY VIBROMETER

Carl P. Spaulding, Pasadena, Calif., assignor to Consolidated Engineering Corporation, Pasadena, Calif., a corporation of California Application December 9, 1950, Serial No. 200,081

6 Claims. (Cl. 73—71)

This invention relates to the measurement of translational vibratory motions and provides improved apparatus which permits the measurement of translational vibrations of frequencies in the order of a few cycles per second (C. P. S.). The apparatus, commonly known as a vibrometer, is essentially a transducer which converts mechanical motion into an electrical signal.

In conventional vibrometers, a spring-supported seismic or inertia mass is mounted in a case to move in a linear path parallel to the motion being measured. At frequencies high compared to the natural frequency ($f_n$) of the seismic mass and spring, the mass essentially stands still while the case moves past it. The relative motion of the case and mass is measured to determine the nature of the translational vibrations acting upon the vibrometer.

The conventional instrument will measure satisfactorily the magnitude of vibrations of frequencies high compared to the natural frequency of the mass and spring. However, due to characteristics inherent in such a construction, a vibrometer of this type designed to measure low frequency vibrations must be relatively large.

For the measurement of low frequency vibrations, the sag of the spring suspension of the conventional vibrometer must necessarily be relatively large. Sag may be defined as the deflection of the system resulting from a change in acceleration or gravity and in the case of linear motion is inversely proportional to the square of the $f_n$ of the mass and spring (e. g. at an $f_n$ of 10 C. P. S. the sag is 0.1 inch and at 1 C. P. S. the sag is 10 inches). If the vibrometer is to operate in any position the clearance or the relative free motion of the mass must be twice the sag. Moreover, if the instrument is to be used under varying accelerations, the clearance must be great enough to accommodate the mass at the greatest expected acceleration (which may be measured in gravity or "g" units, $1g=32.2$ ft./sec.$^2=980$ cm./sec.$^2$).

Furthermore, since low frequency vibrations usually have very large amplitudes, the amplitude of the relative motion of the case and mass will be accordingly greater than at high frequencies.

It is plain that a low frequency vibrometer of the spring-supported mass type must be very large indeed compared to a high frequency vibrometer to overcome these several inherent characteristics. The vibrometer of the present invention operates on a totally different principle which permits the construction of a very small instrument to measure low frequency vibrations. Generally speaking, the vibrometer of the invention includes a case and an inertial or seismic mass mounted within the case to rotate about an axis with the center of gravity of the mass spaced from the axis of rotation. Elastic means opposing rotational motion of the mass are provided, together with means for sensing rotational motion of the mass relative to the case.

An acceleration of the case having a component perpendicular to the axis of rotation and to the eccentricity of the center of gravity will produce a torque about the axis of rotation. In this manner, translation of the case causes a rotational motion of the mass. This rotational motion is sensed to determine the nature of the vibration producing the translation of the case.

The $f_n$ of the vibrometer of the invention is the $f_n$ of the mass in rotation. The $f_n$ can be made very low without a corresponding large sag (defined as before). In this instrument a large sag is undesirable as it introduces inaccuracies. It will be recalled that in the vibrometer of the linear spring-supported type the $f_n$ and sag are each uniquely defined by the other. In the rotational system of the invention, $f_n$ and sag are independent of each other. Thus, the $f_n$ of the system may be reduced (which is desirable as this permits measurement of the lower frequency vibrations) without increasing undesired static sag.

Preferably, the radius of gyration of the mass is made large compared to the eccentricity of the center of gravity. This is desirable because static sag is proportionally reduced by the ratio of the radius of gyration squared to the eccentricity squared. This ratio is established mathematically as follows:

$$I = M(r^2 + e^2) \text{ gm. cm.}^2 \qquad (1)$$

where $I$ = moment of inertia about the axis of rotation
$M$ = mass in grams
$r$ = radius of gyration in centimeters
$e$ = eccentricity of the center of gravity in centimeters if the restoring spring constant (i. e. the elastic means opposing rotational motion) is $k$ dyne-cm. per radian.

The natural frequency, $f_n$, is given by the following expression $$f_n = \sqrt{\frac{k}{I}} \text{ radians/sec.} \qquad (2)$$

Static torque is equal to $980\, Me$ dyne cm. when the eccentricity vector of the center of gravity is horizontal.

$$\text{Static sag} = \frac{\text{Static torque}}{\text{Restoring spring constant}} = \frac{980\, Me}{k} \text{ radians} = \frac{980\, Me^2}{k} \text{ cm} \qquad (3)$$

Combining Equations 1 and 2, $k$ is given by the following expression $$k = f_n^2 M(r^2 + e^2) \qquad (4)$$

and substituting this value of $k$ in Equation 3

$$\text{Static sag} = \frac{980}{f_n^2} \cdot \frac{1}{1 + r^2/e^2} \qquad (5)$$

It follows that when $r/e$ is large compared to one, the static sag is reduced by $r^2/e^2$. This fact is an important feature of the invention because in a small instrument, the allowable static sag is necessarily small. This being true, the allowable static sag, say of a very small vibrometer, may be readily obtained by simply adjusting the ratio of $r/e$.

Simultaneously with a reduction in sag due to gravity, rotational motion of the mass relative to the case is likewise reduced for any acceleration. This fact makes possible the measurement of very large motions with a relatively small vibrometer.

This single inertia mass construction introduces new problems which effect the accuracies of the vibrometer in that (1) the mass will respond to angular acceleration of the case about the axis of the inertial mass and (2) the mass will respond to translational accelerations perpendicular to those to be measured and to the axis of rotation whenever the center of gravity is displaced from its central position (i. e. when the center of gravity is moved from a line which passes through the axis of rotation perpendicular to the vibration to be measured).

I have discovered that these difficulties may be overcome to give a more accurate and universal instrument through the use of a second inertia mass, having the same product of mass times eccentricity of the first. Accordingly, in a preferred embodiment of the vibrometer of the invention, I employ a second inertia mass spaced from the first mass with the centers of gravity of the two masses being disposed on the opposite sides of their respective axes of rotation. With such a construction, translational acceleration (the acceleration which it is proposed to measure) will cause the masses to rotate in opposite directions. Whereas, rotational acceleration, i. e. acceleration of the case about the axes of rotation of the inertial masses, will cause the masses to rotate in the same direction. To prevent measurement of these undesired rotational accelerations, I provide means which preclude rotation of the two masses in the same direction but which permits rotation in opposite directions. Several such means are possible, e. g. gearing, pulleys, or other suitable linkages. In the embodiment described, I space the two masses in a side by side relationship with crossed ties joining the top of each mass to the bottom of the other.

Broadly speaking, my method of measuring translational vibratory motion consists of causing the vibratory motion to produce a torque on an inertia mass while resiliently impeding rotational displacement of the mass, and sensing the rotational displacement responsive to the torque.

A preferred method of measuring translational vibratory motion consists of suspending two masses to rotate about axes spaced from their centers of gravity, causing the vibratory motion to produce opposing torques on the two masses, preventing rotation in the same direction of the two masses, resiliently impeding rotational displacement of the masses in opposite directions, and sensing rotational displacement of at least one of the masses.

The foregoing and other features of my invention will be more clearly understood from the following detailed description and the accompanying drawings of which:

Figure 1:
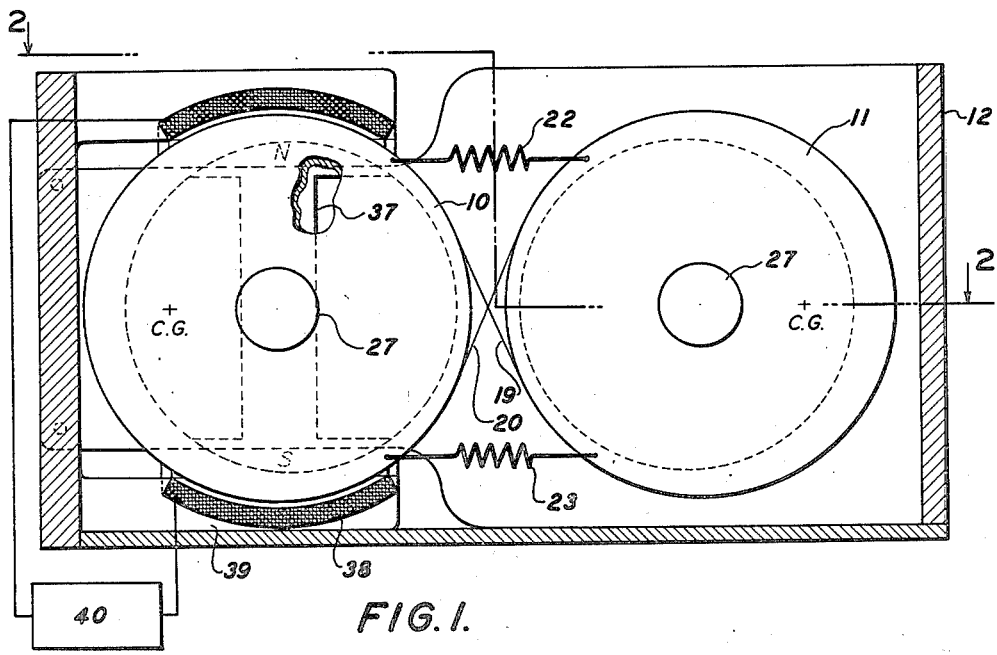
Fig. 1 is a diagrammatic front elevation, partially cutaway, of a presently preferred embodiment of the vibrometer of the invention.
Figure 2:
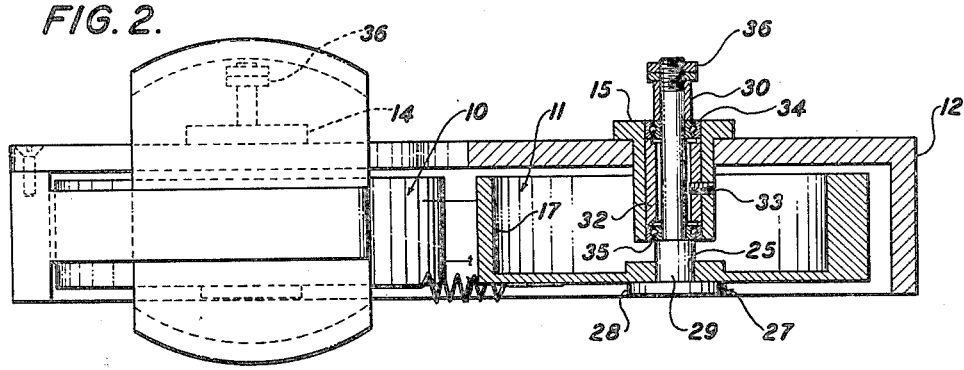
Fig. 2 is a plan view, partially in section, of the vibrometer of Fig. 1, taken along line 2—2 of that figure.

The vibrometer of Figs. 1, 2 includes two inertial cylindrical masses 10, 11 spaced apart in a side by side relationship within a case 12 and supported on axles or spindles 27 by journals 14, 15 to rotate about their longitudinal axes.

In the illustrated embodiment the centers of gravity of the masses are displaced equal distances from the geometric centers of the masses on opposite sides of the respective axes of rotation and lie on a line passing through the axes of rotation. The eccentricity of the centers of gravity may be conveniently brought about by hollowing out each cylinder off center to leave an annular rim 17 which varies in radial thickness throughout its circumference as shown in Fig. 2. The two masses may or may not be of equal weight provided only that the product of mass times eccentricity be the same for both masses.

To assure that the two masses will rotate in opposite directions and to preclude rotation in the same direction, the masses are coupled together by crossed wire ties 19, 20. The two ties bridge the gap between the two masses with opposite ends of each tie being connected tangentially to one of the masses above its axis of rotation and to the other mass below its axis of rotation. If desired, a single continuous wire, looped around the two masses and crossing between the masses, may be used instead of two separate wires.

Figure 3:
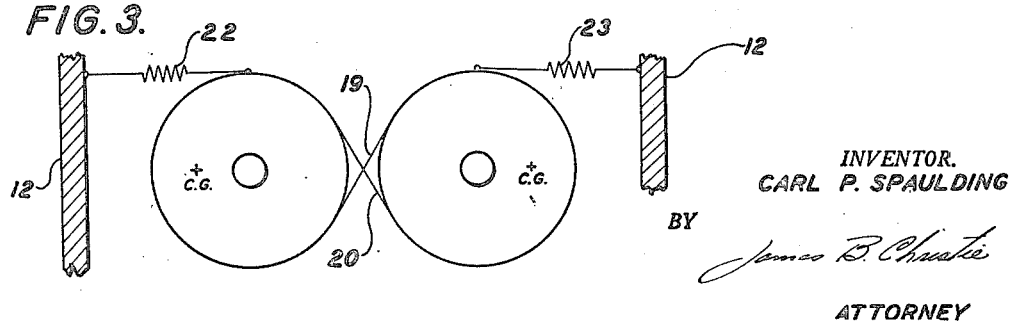
Fig. 3 is a diagrammatic front elevation of a modification of the vibrometer illustrated in Fig. 1.

Two restoring springs 22, 23 bridge the space between the masses, with the upper spring being connected at either end to corresponding points on the outer circumference of each mass above the respective axes of rotation. The lower spring is fastened in a similar manner to the two masses below their axes of rotation. Since the masses rotate in opposite directions, the restoring springs oppose rotational motion of the masses. As an alternative, the two restoring springs may be individually connected to the case as illustrated diagrammatically in Fig. 3. The springs, together with the moment of inertia of the masses, determine the $f_n$ of the inertial system.

Each mass has a central longitudinal bore 25 through which passes the elongated spindle or axle 27 (see Fig. 2). The spindle includes an enlarged head 28 which is held snugly against the outer face of the mass, a stepped portion 29 next succeeding the head, and a shank 30 extending from the stepped portion. The supporting journal 15 extends through a hole in the rear of the case into the interior of the hollowed-out mass. A journalling sleeve 32 is positioned within the journal and is locked thereto by a set screw 33. The shank of the spindle extends through the sleeve, with the sleeve being positioned along the length of the spindle by two bearings 34, 35 which abut either end of the sleeve and rotatably support the shank. The shoulder of the stepped portion of the spindle is held snugly against the bearing 35 to prevent axial motion of the mass. The spindle and mass are held in position by a nut 36 threaded on the outer end of the shank of the spindle. It will be seen that the spindle and mass rotate together with respect to the fixed supporting journal and journalling sleeve. There are numerous ways of rotatably supporting the mass, the object being in each case to reduce to a minimum rotational friction and to prevent axial motion of the mass.

In the embodiment illustrated, the means for measuring rotational movement of the mass relative to the case consists of a permanent magnet 37 carried by the mass 10, and a coil 38 formed on a soft iron yoke 39. As shown in Fig. 1, the magnet 37 is I-shaped, and the two poles of the magnet are located adjacent opposite sides of the coil 38. The magnet 37 may be mounted on the mass 10 by press-fitting it in the hollowed-out interior of the mass. The yoke and coil are fixed to the case, with the coil being connected to sensory means 40. Upon rotation of the mass, a voltage is induced in the coil of a magnitude proportional to the relative velocity between the rotating mass and the case. At frequencies above the $f_n$ of the seismic mass, the output will be proportional to velocity of the case with respect to the inertial system. The relative motion of the mass and case may be measured electrically by other conventional means, e. g. the coil may be carried by the rotating mass and the permanent magnet by the case.

Figure 5:
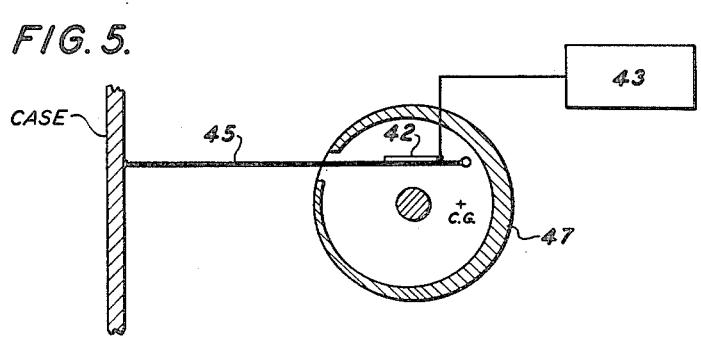
Fig. 5 is a diagrammatic front elevation of a third modification of the vibrometer of the invention.

As an alternative system as shown in Fig. 5, a strain gauge 42 connected to a sensory means 43 may be mounted on a restoring spring 45 of a mass 47 to measure relative displacement of the case and mass. A further simplification involves use of a strain gauge filament as a restoring spring.

Figure 4:
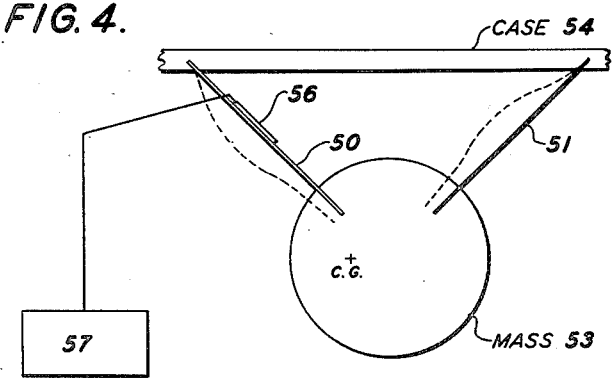
Fig. 4 is a diagrammatic front elevation of a second modification, illustrating another manner of rotatably mounting a mass within the case of the vibrometer.

The vibrometer of Fig. 4 illustrates another way of mounting the seismic mass independent of a fixed axis of rotation. The opposite ends of two leaf or flat springs 50, 51 are fastened respectively to a mass 53 and a case 54. The springs are made relatively wide to preclude transverse bending of the spring, thereby preventing sidewise motion of the mass. The projections of the two springs intercept at an angle of substantially 90° to define the axis of rotation of the mass which axis is spaced from the center of gravity. The flat surfaces of the two springs are mutually perpendicular to a common plane.

This construction has the advantage of being substantially frictionless. It will be noted that the springs serve both as a mount and as restoring springs. The vibrometer of this modification, like the one of Fig. 5, is provided with a strain gauge 56 mounted on one of the leaf springs and sensory means 57 for measuring relative displacement of the case and mass as a function of variation in strain in the spring. The dotted lines illustrate the effect of a translational vibration upon the inertial system.

Figure 6:
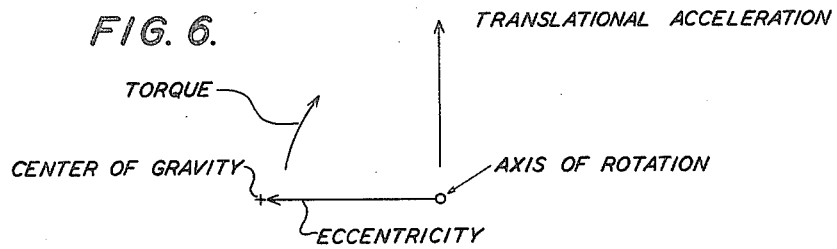
Fig. 6 is a vector diagram, illustrating the effect of a translational acceleration upon the inertial system of the invention.

In operation, the vibrometer of the invention is placed upon a surface whose vibratory motions are to be measured. An acceleration which has a component perpendicular to the axis of rotation and to the eccentricity (Fig. 6) will produce a troque about the axis of rotation. The torque causes a rotational motion of the mass relative to the case. This relative motion or displacement, in turn, is measured to determine the magnitude of the translational vibration acting upon the vibrometer.

I claim:

1. A vibrometer for the measurement of translational vibrations comprising a case, an inertial mass, a first flat spring affixed at its opposite ends to the case and mass in such a manner that the projection of the spring does not pass through the center of gravity of the mass, a second flat spring affixed at its opposite ends to the case and mass in such a manner that the projection of the second spring intercepts the projection of the first spring at an angle of approximately 90° to define the axis of rotation which is spaced from the center of gravity, the two springs supporting the mass with the flat surfaces of the two springs being mutually perpendicular to a common plane and with the width of each spring being such as to preclude sidewise motion of the mass, and means for sensing rotational motion of the mass relative to the case.

2. A vibrometer for the measurement of translational vibrations, comprising a case, a first cylindrical inertial mass mounted to rotate about its longitudinal axis within the case with the center of gravity of said mass being spaced from the axis, a second cylindrical inertial mass identical to and spaced in a side by side relationship from the first mass to rotate about an axis within the case, with the centers of gravity of the two masses lying substantially on a line passing through the respective axes and on opposite sides of said axes, means coupling the two masses together, the coupling means being such that the two masses may rotate in opposite but not in the same directions, elastic means connected to each of said masses for opposing movement of the masses in either direction, and means for sensing rotational motion of at least one of said masses.

3. An apparatus according to claim 2 wherein the elastic means opposing movement of said masses comprises a first spring connected at its opposite ends at corresponding points to the two masses above their respective axes of rotation, and a second spring connected at its opposite ends at corresponding points to the two masses below their respective axes of rotation.

4. An apparatus according to claim 2 wherein the elastic means opposing movement of said masses comprises a first spring connected at its opposite ends to the one of the masses and the case, and a second spring connected at its opposite ends to the other mass and the case.

5. A vibrometer for the measurement of translational vibrations, comprising a case, a first inertial mass mounted to rotate about an axis within the case with the center of gravity being eccentric to the axis, a second inertial mass identical to and spaced in a side by side relationship to the first mass to rotate about an axis within the case, with the centers of gravity of the two masses being disposed on the opposite sides of their respective axes substantially on a line passing through said axes, a pair of crossed ties bridging the space between the masses with opposite ends of each tie being connected respectively and tangentially to one mass above its axis of rotation and to the other mass below its axis of rotation for precluding rotation of the two masses in the same direction but permitting rotation of the two masses in opposite directions, elastic means opposing movement of said masses, and means for sensing rotational motion of at least one of the masses relative to the case.

6. A vibrometer for the measurement of translational vibrations, comprising a pair of substantially identical masses supported side by side to rotate about parallel axes and having centers of gravity which are eccentric with respect to and disposed on opposite sides of their respective axes, means intercoupling the two masses for precluding rotation of the masses in the same direction but permitting rotation of the masses in opposite directions, elastic means coupled to the masses for opposing rotational movement of the masses in either direction, and means for sensing rotational movement of the masses.

References Cited in the file of this patent

UNITED STATES PATENTS

| Number | Name | Date |
|---|---|---|
| 1,300,513 | Taylor | Apr. 15, 1919 |
| 1,727,310 | Klemperer | Sept. 3, 1929 |
| 2,203,061 | Schmettow | June 4, 1940 |
| 2,286,386 | Silverman | June 16, 1942 |
| 2,302,670 | Buchanan | Nov. 24, 1942 |
| 2,343,063 | Kent | Feb. 29, 1944 |
| 2,359,245 | Ritzmann | Sept. 26, 1944 |